United States Patent Office — 3,449,494 — Patented June 10, 1969

3,449,494
ANTI-INFLAMMATORY COMPOSITIONS CONTAINING A CORTICOIDAL STEROID AND A TESTOLOLACTONE
Leonard Joseph Lerner, New Brunswick, N.J., assignor to E. R. Squibb & Sons, Inc., New York, N.Y., a corporation of Delaware
No Drawing. Continuation-in-part of application Ser. No. 330,250, Dec. 13, 1963. This application Sept. 29, 1966, Ser. No. 583,083
Int. Cl. A61k 17/00
U.S. Cl. 424—240
2 Claims

ABSTRACT OF THE DISCLOSURE

Anti-inflammatory composition of a corticoidal steroid and a testololactone.

---

This application is a continuation-in-part of application Ser. No. 330,250, filed Dec. 13, 1963, now abandoned.

This invention relates to novel physiologically active compositions containing steroids useful in the treatment of certain conditions. This invention relates to novel compositions containing corticoidal steroids possessing anti-inflammatory properties.

Heretofore, many corticoidal steroids have been widely employed for their anti-inflammatory properties in the treatment of inflammatory conditions. In addition to these desired anti-inflammatory properties, these steroids also possess glucocorticoid activity which also has some physiological effect. In some cases when these anti-inflammatory steroids are employed over long periods of therapeutic treatment, the glucocorticoidal properties possessed thereby manifest themselves in the mammal by causing undesirable side effects. Among these undesirable side effects can be included catabolism, calcium and nitrogen loss and hyperglycemia or diabetogenic activities. Thus, until now, these anti-inflammatory steroids have never been able to be fully utilized for their anti-inflammatory properties alone due to the fact of the concurrent presence of glucocorticoid activity. The present invention eliminates this major drawback to allow the fullest utilization of these anti-inflammatory steroids.

It has now been found that when an anti-inflammatory corticoidal steroid is therapeutically employed in combination with a testololactone, the undesired glucocorticoidal properties of the anti-inflammatory steroid are substantially eliminated, while the desired anti-inflammatory properties are maintained or, even in some cases, enhanced. This discovery allows the anti-inflammatory corticoids to be employed to their fullest extent while at the same time eliminating the undesirable side effects that heretofore prevented this.

Among the "anti-inflammatory corticoidal steroids" contemplated for use in this invention, there are included compounds generally characterized as the cortisols, cortisones, corticosterones, cortexones, cortexalones, cortols, β-cortols, cortolenes, β-cortolones, Tetrahydro E, Tetrahydro F, prednisolones, prednisones, triamcinolones, dexamethasones and the derivatives thereof possessing, concurrently, anti-inflammatory properties and glucocorticoidal activity, for example, the 6,-16,-21,-11,-9- or 2-substituted derivatives. Many of the steroids which may be satisfactorily employed in the practice of this invention are described by Sarrett et al. in their article, "The Effects of Structural Alteration on the Anti-Inflammatory Properties of Hydrocortisone," in Volume 5 of Progress in Drug Research (1963) pages 13, et seq.

By use of the term "testololactone," there is meant to include those compounds having a testololactone nucleus and includes inter alia such compounds as testololactones; 1-dehydrotestololactone; 6 - dehydrotestololactone; A-nortestololactone and derivatives thereof, for example, the 11-substituted derivatives, such as, 11-hydroxytestololactone, 11 - hydroxy-$\Delta^1$-testololactone, 11 - acyloxy-$\Delta^1$-testololactone; e.g. 11-acetoxy-$\Delta^1$-testololactone; 11-keto-$\Delta^1$-testololactone; 11-ketotestololactone; 11-hydroxy-17α-oxa-D-homo-androstane-3,17-dione; 9-substituted derivatives, such as, 9-halo-11-keto-1-dehydrotestololactone; 9-halo-11-keto-testololactone; 16-substituted derivatives, for example, 16-alkoxytestololactone; 16-alkoxy-$\Delta^1$-testololactone; 16-hydroxytestololactone; 16-hydroxy-1-dehydrotestololactone; 16-hydroxy-A-nor-testololactone; 16-alkoxy-17a-oxo-D-homo-5α-androstane-3,17-dione; 16 - acetoxy-A-nortestololactone; 16α-acetoxy-$\Delta^1$-testololactone; 16-keto-A-nortestololactone; 16-keto-$\Delta^1$-testololactone; 15-substituted derivatives, such as 15-hydroxy-$\Delta^1$-testololactone; 15-acetoxy-$\Delta^1$-testololactone; 15-keto-$\Delta^1$-testololactone; 7-substituted derivatives, for example, 7-hydroxytestololactone, 7-acetoxytestololactone; the 6-substituted derivatives, such as, 6-hydroxytestololactone, 6-acetoxytestololactone; and 6-ketotestololactone and the 17a-oxo-D-homoandrostanes-3,17-dione and the 5-substituted derivatives thereof, for instance, 5-hydroxy-17a-oxo-D-homo-5α-androstane-3,17-dione. In addition to the known testololactones and their derivatives, reference can be had to application, Ser. No. 165,657, filed Jan. 11, 1962, now U.S. Patent 3,174,982 in the names of Patrick Diassi et al. and application, Ser. No. 254,611, filed Jan. 29, 1963, now U.S. Patent 3,129,229, in the names of R. Robinson et al., for some of the testololactones of this invention.

It has been found that the desired results of this invention can be obtained when one part by weight of the corticoidal steroid is combined with from 0.005 to 10.0 parts by weight of the testololactone employed, depending upon the specific compounds being employed. Most preferably, it has been found that the use of one part of the corticoid combined with from 0.1 to 5.0 parts of the testololactone gives very satisfactory results.

The compositions of this invention include parenterally, perorally and topically acceptable compositions. These compositions are administered so as to give a daily dosage of corticoid of about 5 to about 200 mg. per kilogram of body weight of the mammal being treated, the upper limit being used for initial medication.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the desired corticoid, testololactone and excipients (e.g., starch, talc, stearic acid, and/or magnesium stearate), the corticoid being present in an amount of the order of about 2.5 mg. to about 200 mg., preferably about 5 mg. to about 100 mg. per capsule. Also, one piece gelatin capsules containing the same amount of medicament may be prepared using sufficient corn oil or other suitable vegetable oil, to render the compound capsulatable. Tablets may be prepared to contain the same order of medicament by using starch, lactose or other conventional excipients, and may be scored to enable one to take fractional dosages, if desired. Any of the tableting material used in pharmaceutical practice may be employed where there is no incompatability with the particular corticoid.

The corticoid testololactone compositions of this invention may also be prepared in liquid form. Thus, a composition may be prepared to contain about 1.0 mg. or more of corticoid per ml. of liquid pharmaceutical carrier, such as a carbohydrate-containing (e.g. sirup), aqueous, or aqueous-alcoholic (e.g. elixir) vehicle, these liquid compositions then being administered in 5 ml. or more doses.

Parenteral formulations can be prepared in the usual manner to provide either aqueous suspensions or oil-based solutions of the medicaments of this invention. For example, an aqueous suspension can be formed by mixing the corticoid and testololactone with water in such proportions that a dose of the corticoid in the order of about 25 to about 500 mg./ml. of the final composition is achieved.

The medicaments may also be administered topically in the form of ointments or lotions which are compounded in the usual manner to give products containing the corticoid in a concentration of at least 0.01% and preferably about 0.1%.

The following examples illustrate suitable compositions of this invention:

Example 1.—Tablets containing triamcinolone and $\Delta^1$-testololactone

To prepare 100 tablets each containing 2.5 mg. of acid, the following ingredients are used:

| | Grams |
|---|---|
| Triamcinolone | 0.25 |
| $\Delta^1$-testololactone | 0.06 |
| Dicalcium phosphate | 3.6 |
| Lactose | 6.0 |
| Corn starch | 1.8 |
| Granulating paste (corn starch in water, 11% in weight) | 0.2 |
| Distilled water | 2.3 |
| Talc | 0.3 |
| Magnesium stearate | 0.04 |

A tablet granulation is prepared from these ingredients by passing the corticoid and testololactone through a 100-mesh screen, the dicalcium phosphate, lactose and corn starch are passed through a 60-mesh screen; the screened materials are intermixed; the granulating paste and sufficient water are worked in to give a pasty consistency, and the material passed through a large mesh (e.g. No. 16) screen to produce granules. The granules are tray dried at 130° F. for three hours; and the dry granulation is put through a No. 20 (to 24) screen and mixed with the previously sieved talc and magnesium stearate. The resulting granulation is compressed into tablets, each containing about 2.5 mg. of corticoid.

In a similar manner all other corticoids and testololactones within the purview of this invention may be treated.

Example 2.—Capsules of hydrocortisone and 15-keto-$\Delta^1$-testololactone

The following ingredients are for the preparation of 100 dry-filled capsules, each containing (4 mg.) of the hydrocortisone:

| | Grams |
|---|---|
| Hydrocortisone | 0.4 |
| 15-keto-$\Delta^1$-testololactone | 0.004 |
| Lactose | 75.0 |
| Magnesium stearate | 0.8 |

These ingredients are uniformly intermixed in the manner known in the art and filled into two-piece hard gelatin capsules to provide capsules each containing 4 mg. of corticoid.

In a similar manner all other corticoids and testololactones within the purview of this invention may be treated.

Example 3.—Aqueous suspension of triamcinolone acetonide and A-nortestololactone The following ingredients are for the preparation of an aqueous sterile suspension of triamcinolone acetonide and A-nortestololactone, providing a dose of 50 mg./ml. of the corticoid:

| | Grams |
|---|---|
| Triamcinolone acetonide | 50.0 |
| A-nortestololactone | 5.0 |
| Benzyl alcohol | 9.0 |
| Sodium chloride | 6.6 |
| Carboxymethyl cellulose | 5.5 |
| Methylcellulose | 0.75 |
| Water, q.s. liter | 1.0 |

In preparing the composition, the sodium chloride, carboxymethylcellulose and methyl cellulose are added to 100 cc. of water with attendant stirring. The triamcinolone acetonide, A-nortestololactone and benzyl alcohol are then added with accompanying agitation. Sufficient water is then added to bring the volume to 1 liter. The resultant suspension is then metered into vials of selected size, for example, 10 cc. vials, from which the suspension can be withdrawn for therapeutic application by parenteral administration.

In a similar manner all other corticoids and testololactones within the purview of this invention may be treated.

Example 4.—Ointment with triamcinolone acetonide and testololactones

An ointment may be prepared by adding 2.5 mg. of testololactone and 0.25 mg. of triamcinolone acetonide to 97.25 mg. of a petroleum oil-polyethylene ointment base prepared according to the teachings of U.S. Patent 2,627,938, issued Feb. 10, 1953 to Frohmader et al.

Other corticoids and testololactones within the purview of this invention may likewise be treated.

Example 5.—Liver glycogen levels of this invention

The measure of the deposition of liver glycogen caused by the administration of a therapeutic agent is a guide to the glucocorticoidal activity thereof. The higher the liver glycogen deposits, the more glucocorticoidal activity.

Adrenalectimized male rats weighing 100 to 120 grams are put on a high protein and saline diet. Food is removed for one day to stabilize the liver glycogen level of the animal. The control, the corticoid (cortisone acetate) and the test compositions of cortisone acetate and $\Delta^1$-testololactone are administered in a single subcutaneous injection, the animals are sacrificed seven hours later and the glycogen analyses are performed, the results reported in Table I.

TABLE I

| Compound | Dose (mcg.) | Mg. percent liver glycogen |
|---|---|---|
| Control (vegetable oil) | | 0.06 |
| Cortisone acetate | 100 | 0.18 |
| | 200 | 0.60 |
| | 400 | 0.82 |
| | 800 | 1.24 |
| Cortisone acetate+2.5 mcg. $\Delta^1$-testololactone. | 100+2.5 | 0.12 |
| | 200+2.5 | 0.14 |
| | 400+2.5 | 0.19 |
| | 800+2.5 | 0.45 |

In addition to the foregoing, when the following compounds are tested in accordance with the procedures of Example 5, the percentage of inhibition of liver glycogen activity reported in Table II is obtained when contrasted with 400 mcg. of cortisone acetate.

TABLE II

| Compound | Dose (+ cortisone acetate, 400 mcg.) (mg.) | Percent inhibition |
|---|---|---|
| 16α-hydroxy-Δ¹-testololactone | 0.64 | 15 |
| 16-keto-Δ¹-testololactone | 0.04 | 50 |
| 7α-hydroxytestololactone | 5.0 | 60 |
| 15-keto-Δ¹-testololactone | 5.0 | 50 |
| 15α-hydroxy-Δ¹-testololactone | 0.64 | 30 |

Example 6.—Anti-granuloma activity

Adrenalectimized rats weighing 140 to 150 grams are put on a high protein and saline diet. Dry cotton pellets of known weight are implanted subcutaneously on each side of the thorax of the animals. The test compounds are subcutaneously injected for six days and the animals are autopsied on the eighth day. The cotton pellets are removed and dried and weighed to get the weight of the granuloma tissue. The results are set forth in Table III.

TABLE III

| Compound tested | Daily dose (mg.) | Granuloma tissue dry weight (mg.) |
|---|---|---|
| Control vehicle | | 17.2 |
| Hydrocortisone acetate | 2.7 | 4.6 |
| Do | 0.9 | 7.6 |
| Do | 0.3 | 12.1 |
| Do | 0.1 | 16.2 |
| Δ¹-testololactone | 0.1 | 15.8 |
| Δ¹-testololactone (0.1 mg.): +Hydrocortisone acetate | 2.7 | 4.2 |
| Do | 0.9 | 8.3 |
| Do | 0.3 | 12.7 |
| Do | 0.1 | 13.1 |

What is claimed is:

1. A composition possessing anti-inflammatory properties, which comprises one part by weight of a corticoidal steroid, intimately combined with from about 0.01 to about 10.0 parts by weight of testololactone.

2. The composition of claim 1 wherein the testololactone is selected from the group consisting of testololactone, 1-dehydrotestololactone, 6-dehydrotestololactone, A-nortestololactone and 4-dihydrotestololactone.

References Cited

UNITED STATES PATENTS 3,129,229   4/1964   Robinson et al. ____ 260—343.2

ALBERT T. MEYERS, *Primary Examiner.*

S. J. FRIEDMAN, *Assistant Examiner.*